United States Patent [19]
Hecker

[11] Patent Number: 5,664,196
[45] Date of Patent: Sep. 2, 1997

[54] MEDIA ACCESS SCHEDULER METHOD AND APPARATUS

[75] Inventor: Mark Bennett Hecker, Northboro, Mass.

[73] Assignee: EMC Corporation, Hopkinton, Mass.

[21] Appl. No.: 568,857

[22] Filed: Dec. 7, 1995

[51] Int. Cl.⁶ .............................. G06F 13/36; G06F 13/14
[52] U.S. Cl. .......................... 395/726; 395/730; 395/288; 395/299; 395/305; 395/602
[58] Field of Search ..................................... 395/726, 728, 395/730, 287, 288, 299, 305, 601, 610

[56] References Cited

U.S. PATENT DOCUMENTS

| | | | |
|---|---|---|---|
| 5,317,749 | 5/1994 | Dahlen | 395/725 |
| 5,379,424 | 1/1995 | Morimoto et al. | 395/600 |
| 5,392,433 | 2/1995 | Hammersley et al. | 395/725 |
| 5,526,524 | 6/1996 | Madduri | 395/726 |
| 5,544,353 | 8/1996 | Forman et al. | 395/600 |
| 5,551,023 | 8/1996 | Alonso | 395/600 |
| 5,566,305 | 10/1996 | Levenstein | 395/299 |
| 5,596,754 | 1/1997 | Lomet | 395/726 |

*Primary Examiner*—Jack B. Harvey
*Assistant Examiner*—Jigar Pancholi
*Attorney, Agent, or Firm*—Maureen Stretch

[57] ABSTRACT

A media access scheduling system that allows concurrent users to access shared media by having each user decide, as it gets access to the media, whether it is the best candidate for the use of the media: if it is, it proceeds to use the media; if it is not, it does not access the media, but instead releases access reservation and waits for a time when it may be the best candidate. In a preferred embodiment, the determining factor for the best candidate is whether the media needs to be repositioned or setup. If the media is positioned where the candidate wants it to be, no positioning or setup is required, and the user declares itself to be the best choice. If the media must be repositioned or setup, then there is probably another user process which would be a better candidate. To identify when a user is finished with the media and repositioning or setup is warranted, each user program refers to and maintains an access time in a globally visible place. If some period of time has elapsed since the previous access to the volume, it is likely that the previous user program has finished, and a candidate which requires repositioning should proceed. To prevent users from waiting indefinitely, each candidate keeps track of the time it has spent waiting, and upon reaching some predetermined limit of continuous waiting, accesses the media regardless of whether or not it needs to reposition.

20 Claims, 6 Drawing Sheets

MEDIA ACCESS SCHEDULER METHOD AND APPARATUS

BACKGROUND OF THE INVENTION

This invention relates generally to systems for managing the sharing of magnetic tape volumes and similar sequential media or other devices that may require significant setup or repositioning time for use, and more particularly for a method and apparatus for shared media access scheduling for concurrent access by multiple users.

Magnetic tape systems are essentially sequential access devices. That is, in order to read a specific data item, the tape must be positioned along its length to that item. To read a data item in the middle of the tape, the entire first half of the tape must ordinarily be passed, sequentially, before the data item can be read. With tapes capable of containing several thousands of megabytes of data, it can take as long as four or eight hours or more to read or write an entire tape. Repositioning the tape from its beginning to its end does not take as long, since skip operations are available that will allow the tape to go forward or backward at speeds faster than normal reads or writes. Yet it still takes 192 seconds or 3.2 minutes, even to do a high-speed skip from the beginning to the end of a typical 8 mm tape cartridge 112 meters in length. Given the capacity of such tapes, several files can usually be recorded on one cartridge or cassette or reel. Consequently, sharing such a volume so that concurrent application processes or users can access the files tends to improve overall throughput on a system.

Some application-level filesystems such as applicant's Assignee's EBFS Backup File Serve system allow concurrent access to sequential volumes such as magnetic tape or optical media by multiple users. In this kind of system, users are operating on files, without regard to what media or actual volume the files reside on. Thus, it is not desirable or practical for the users to arbitrate among themselves for use of the specific shared media which contains the files. A given user application may execute on one day with two other applications, A & B, and on a subsequent day, the same user application may be executing concurrently with applications B & C. Thus, a user application cannot predict what other applications will be executing at the same time.

A filesystem cannot anticipate a user's future requests, so it cannot reserve access to the media for more than the current request. Therefore, one way to schedule the use of the shared media is to have each user reserve access to the appropriate media volume with each request, and release that reservation at the conclusion of the operation.

If there are multiple users requesting access to the same volume, the users are likely to access the volume in a round robin fashion, with each successive operation coming from a different user. If the users are accessing different parts of the volume, and the cost of moving to a different part of the volume is high, as it is on such sequential media as magnetic tape, or in the case of optical disk "jukeboxes" having multiple disks, or robotic tape systems having multiple tape cassettes, this round-robin access pattern can result in the worst possible performance, as each operation suffers from the cost of repositioning the shared media.

For example, as shown in FIG. 6, if one user, A is reading a file at the beginning 142a of a shared tape volume 142 and a second user, B is writing a new file 142d at the end of that same volume, this round-robin approach could result in user A reading at the beginning of the volume 142a, then user B repositioning it to the new file 142d at the end of the tape to write some data. The next request in a round robin scheme would be from user A, to read at the beginning, 142a. This would require another reposition, and so on. For present day 8 mm tape systems, each reposition of the tape might take an average of 3-5 minutes for 112 meter long tapes. In applicant's Assignee's systems, 8 mm 5 gigabyte tapes are formatted in groups of 2048 records between filemarks. In this system, the average positioning would be half the length of the tape to a filemark, then half the length again to the next filemark. It is estimated that in this format the worst case timing to position to a record is about 320 seconds or approximately 5.3 minutes.

While the concurrently running applications that are sharing the tape are able to proceed, this round-robin-by-default scheduling of their requests may lower throughput and efficiency, if the number of repositions is high. If a tape contains more than 4 files and 4 concurrently running applications are accessing it, each may need to spend 3-5 minutes or more repositioning the tape each time it gets control. In just one "round" of round-robin scheduling, this might represent a waste of 12-15 minutes or more in repositioning time.

Tape robots that manage multiple tape cartridges or cassettes also have significant repositioning times. Exchanges of 8 mm Exabyte tapes usually require 2-3 minutes. Optical disk jukeboxes have significant repositioning times, too. In these, the times required to load and unload a disk vary widely but the fastest drives have a 2 headed picker, that can put away one platter while spinning up a new platter. The more typical ones have to spindown the present disk, put it away, pickup the desired next one, insert it, and spin it up. It can take between 2-30 seconds or more to do all that.

In computer data access, where hard drive accesses and seeks are considered slow if they exceed 20 milliseconds, times that are measured in seconds or minutes are very slow by comparison.

To prevent time lost to media repositioning, another approach is to disallow concurrent access by multiple users requesting access to different parts of the same physical volume. However, for it to be known in advance that users were going to access the same physical media, the users need to be aware of which physical volumes are being accessed. Requiring the users to identify the physical volumes of interest and to reserve access to those volumes creates a significant burden for the users in systems where large numbers of tape or optical volumes may exist for archival storage or database backups, for example.

A third approach to managing concurrent access is to allow multiple users to proceed until a conflict arises over the use of a volume. At this point one user continues while all other users wait until the favored user finishes. Such a system requires the configuration of policies for selecting the favored user, and, without careful consideration on the part of the users, can be subject to deadlock situations in which the favored user is waiting for the completion of one of the waiting users.

It is an object of the present invention to provide a method and apparatus for scheduling access to shared media by concurrent users that reduces time lost by delays due to repeated setup or repositioning.

It is another object of the present invention to provide a method and apparatus for scheduling access to shared media by concurrent users without requiring the users to keep track of physical volume identities.

Still another object of the present invention is providing shared media access scheduling that does not increase the likelihood of deadlocks occurring.

Yet another object of the present invention is providing shared media access scheduling by concurrent users that does not require special access policies for determining priority of the users for access to the shared media.

SUMMARY OF THE INVENTION

These and other objects of the invention are achieved by a media access scheduling system that allows concurrent users to access shared media by having each user decide, as it gets access to the media, whether it is the best candidate for the use of the media: if it is, it proceeds to use the media; if it is not, it does not access the media, but instead releases its reservation and waits for a time when it may be the best candidate. In a preferred embodiment, the determining factor for the best candidate is whether the media needs to be repositioned or setup. If the media is positioned where the candidate wants it to be, no positioning or setup is required, and the user declares itself to be the best choice. If the media must be repositioned or setup, then there is probably another user process which would be a better candidate. To identify when a user is finished with the media and repositioning or setup is warranted, each user program refers to and maintains an access time in a globally visible place. If some period of time has elapsed since the previous access to the volume, it is likely that the previous user program has finished, and a candidate which requires repositioning should proceed. To prevent users from waiting indefinitely, each candidate keeps track of the time it has spent waiting, and upon reaching some predetermined limit of continuous waiting, accesses the media regardless of whether or not it needs to reposition.

It is an aspect of the present invention that it can reduce the time lost through repositioning of tape devices due to concurrent access. Performance improvements at least 3-4 times better than normal processing have been found in some worst-case scenarios. It is anticipated the present invention may achieve performance improvements that are 10 to 20 or more times faster for other read/write patterns.

It is another aspect of the present invention that it provides user programs with reasonable access to shared media even when the number of concurrent users is significant.

Yet another aspect of the present invention is that it can be applied to concurrent access to shared objects in which a significant time penalty is incurred by repositioning of the object or media.

DETAILED DESCRIPTION OF THE INVENTION

Figure 1:
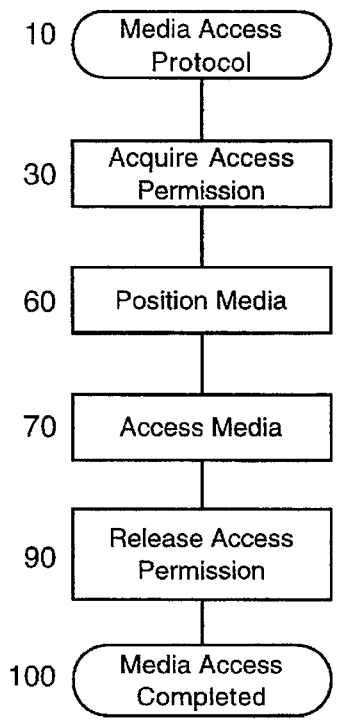
FIG. 1 is a flow diagram of a system according to the method and apparatus of the present invention.

With reference now to FIG. 1, in the flow diagram shown, the present invention uses the media access protocol 10 of a system that controls the shared access media. In a preferred embodiment, this is a filesystem that manages tape and robotic subsystems. However, as will be apparent to those skilled in the art, the methods and apparatus of the present invention can be used to schedule access by concurrent users to other types of shared sequential media, such as writable optical drives, or to media in "jukeboxes" or media changers, where the time to reposition the media, or to set it up for use, is more costly than minor periods of waiting by the user programs or processes. Thus, for purposes of illustration but not limitation, the present invention could be used not only in data storage applications, but in computer automated manufacturing where the "media" being scheduled is a shared production line or process or tool that can be reconfigured for each of several different concurrent users. As will be apparent to those skilled in the art, it has applicability in automated situations where setup or re-positioning of a shared object occurs frequently and is costly.

Still in FIG. 1, at step 30, a user process begins to acquire access permission to the shared media in a preferred embodiment. Step 30 is shown in greater detail in FIG. 1a. To acquire access permission, the user program saves the time it started this access at step 32 in a beginning time location 132 (shown in FIG. 4). In a preferred embodiment, the user process would next acquire an access lock at step 34. In this embodiment, applicant's Assignee's EBFS Backup File Serve filesystem insures that the process which has this lock is the only user process able to access the volume until the lock is released. Other systems provide similar ways of blocking access by others for a period of time, while an access occurs.

Figure 1A:
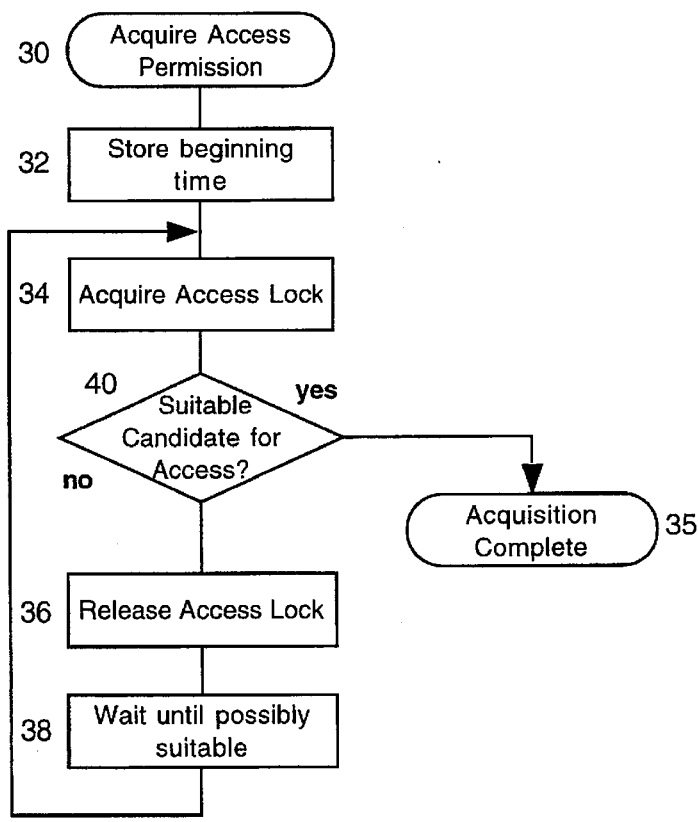
FIG. 1a is a flow diagram of the present invention.

At step 40 of FIG. 1a, a suitability analysis is done. If the present user process determines at step 40 that it is the best candidate to access the device, it grants itself access permission and exits at step 35 and returns to step 60 in FIG. 1 to position the media, access it at step 70 and release access permission at step 90.

However, returning to FIG. 1a, if the present user process decides it is not the best candidate for access at step 40, it releases the access lock at step 36 and enters a wait status at step 38. The amount of time a process will wait before deciding that it should check its suitability again is configurable by the end user. Typically, it will be based on the nature of the shared media and the experience gained at a given installation. In a preferred embodiment, where tape systems are being accessed, a 5 second check wait period is used for each process.

Still in FIG. 1a, in a preferred embodiment, after the check wait period has expired, the process returns to step 32 to get an access lock, and then checks again, at step 40, its suitability as best candidate. This suitability analysis is shown in greater detail in FIG. 2.

Figure 2:
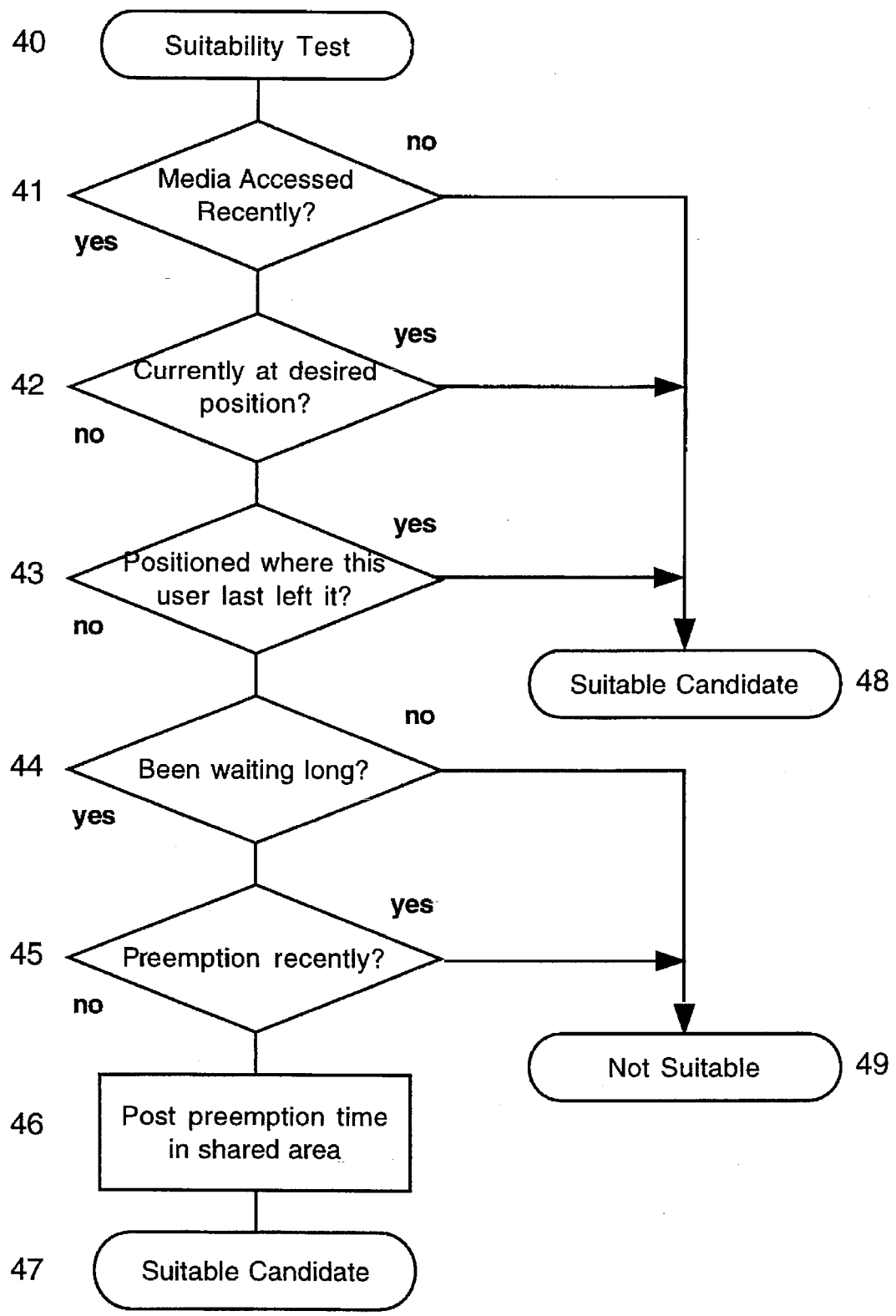
FIG. 2 is a flow diagram of a suitability analysis according to the method and apparatus of the present invention.

In FIG. 2, at step 41, a determination is made as to whether the media has been accessed recently. The last access time is stored in a location globally visible to all concurrent users. In a preferred embodiment, this is a shared memory element such as last access time 122 in FIG. 4. If the media has not been accessed recently, this means other users are now probably inactive. So this process is the best candidate, and will grant itself access permission and, returning to FIG. 2, will exit at step 48 to position the media and access it.

However, if the determination from step 41 of FIG. 2 was that the media has been accessed recently, according to the method and apparatus of the present invention the process next checks, at step 42, to see if the media is currently positioned at the desired place. This is done by comparing another globally visible element such as current position 120 in shared memory (shown in FIG. 4) with the desired location of the media. In the case of tape systems, for example, if the tape is already positioned where this process wants it, no positioning at all is required. So, in that instance, in FIG. 2, the process again declares itself to be the best candidate and exits at 48.

Still in FIG. 2, if the tape is not where the process wants it, at step 43 the process can check to see if the tape is at least positioned where the user process last left it. To avoid unnecessary waiting for the volume to become apparently idle, the user that completed the most recent operation may reposition without waiting. Since it is likely that the new request will be near the previous request, the most recent user receives this special treatment.

One way in which the process can tell if the current tape position is where the process left it, is by means of a locally visible element such as local position element "where we left" 130, (shown in FIG. 4) which would be in local memory allocated to the process. As will be apparent to those skilled in the art, various other ways of keeping track of media positions and time can be used, such as storing all such elements in shared memory tables, or in control blocks accessible to the user processes or in another file available to the system. Similarly, in a preferred embodiment, the locally visible elements persist only as long as they are needed to serve their function. For example, beginning time 132 is a local variable that does not need to persist once access permission can be acquired, and is released in a preferred embodiment. Local position 130 is a variable that must persist between accesses to the particular volume by a particular process. Globally visible elements such as current position 120 persist as long as the filesystem granting shared access is operational. And as will also be apparent, the present invention could be implemented in systems that do not allow preemption, thus removing the need for preemption indicators.

If the tape has been recently accessed by another user, and is not positioned near where the current process wants it or left it, the current process, according to the method and apparatus of the present invention, would next check at step 44, to see if it has been waiting a long time.

In a preferred embodiment, each process implementing the present invention would check to see if it has been waiting some predetermined continuous period of time without access and without preempting other users. At step 44, the process first checks to see if it has been waiting some predetermined continuous period of time by checking the time that has elapsed since it began this suitability testing, as shown in local memory element beginning time 132, in FIG. 4. Back in FIG. 2, at step 45, the process also checks to see if there has been any preemption recently, by inspecting the globally visible element last preempt time 124 in shared memory, (shown in FIG. 4). One reason for checking the globally visible last preempt time 124 is to prevent a number of processes from preempting in quick succession when all have been waiting for the duration of the preempt interval.

If the process has been waiting the predetermined continuous period without preempting, it can decide that it is now the best candidate, even if the tape or shared device will be repositioned or setup again as a result. In this case, at step 46, (shown in FIG. 2) the process will post the time of this reposition or setup in the globally visible last preempt time 124 in shared memory (shown in FIG. 4) and, at step 47, return to step 60 of FIG. 1 to position and then access the media.

In a preferred embodiment, the predetermined continuous waiting time is set to 15 minutes for 8 mm tape applications. As will be apparent to those skilled in the art, this parameter can be varied to meet the requirements of a given installation, and will probably vary based on the type of media being shared and the nature of the application programs.

Returning to FIG. 1, once the process has determined that it is the best candidate, granted itself access permission, positioned the media, if necessary, and accessed the media to perform a read or write or other operation on the media, in a preferred embodiment it will then release the access permission at step 90. This allows another user to acquire access permission and check its suitability.

Figure 3:
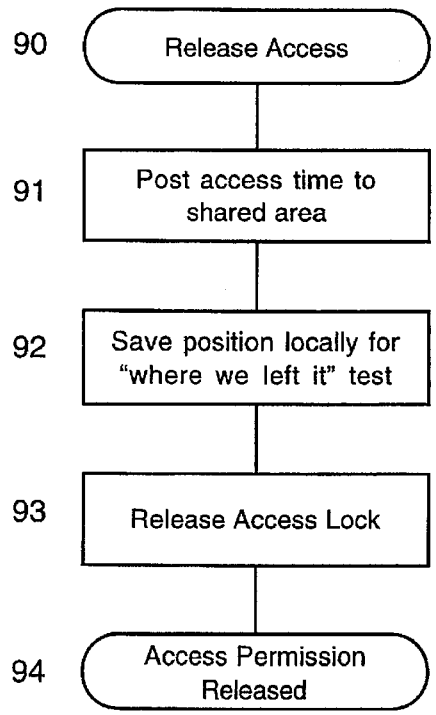
FIG. 3 is a flow diagram of access release according to the method and apparatus of the present invention.

With reference now to FIG. 3, a more detailed view of the step of releasing access permission is shown. In a preferred embodiment, when access permission is released, a process will post, at step 91, its access time to the globally visible area in last access time 122, in shared memory (as shown in FIG. 4).

Figure 4:
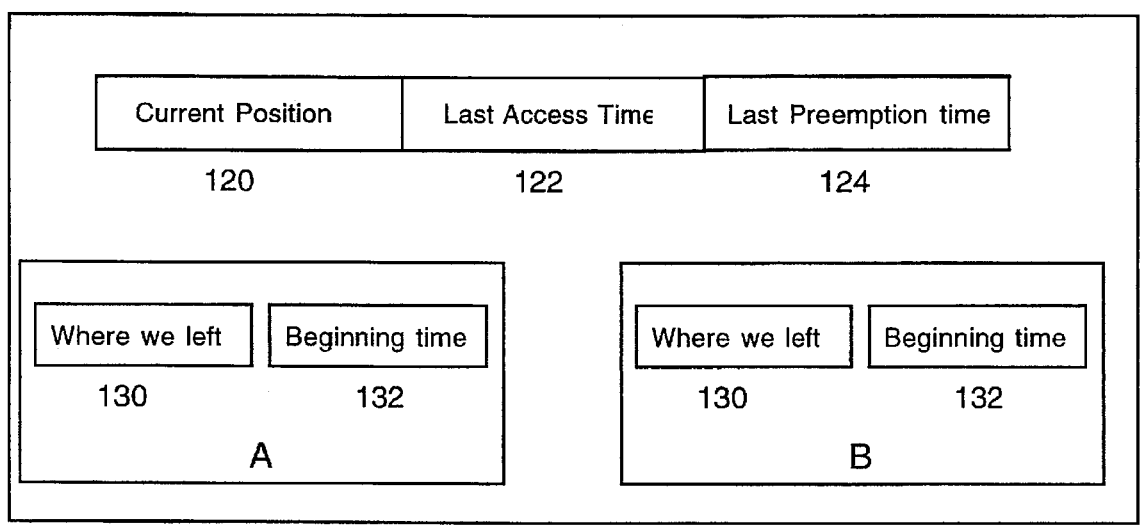
FIG. 4 is a schematic representation of global and local memory elements according to the method and apparatus of the present invention.

Back in FIG. 3, at step 92, the process will next save the current position of the media in a where we left element 130, (shown in FIG. 4.) In a preferred embodiment, where we left 130 and beginning time 132 for each process are stored in the local memory allocated to that process. As shown in FIG. 4, both process A and process B have their own where we left elements 130 and beginning time elements 132, but can also see the globally visible current position 120, last access time 122, and last preempt time 124 in shared memory.

Returning to FIG. 3, once the process has saved the position where it last left the media, it releases the access lock at step 93 and exits at step 94, in effect releasing the access permission it granted itself. Now returning to FIG. 1, at step 100 a process has accomplished a media access and may proceed to its next operation.

In a preferred embodiment of the present invention, it remains possible for a single user to be "impolite" or uncooperative and preempt and then hold on to the access to the media until it completes its operations. Thus, an emergency application could be run on this exclusive priority basis. Alternatively, the predetermined waiting period might vary by type of application, if the system users so desire.

Figure 5:
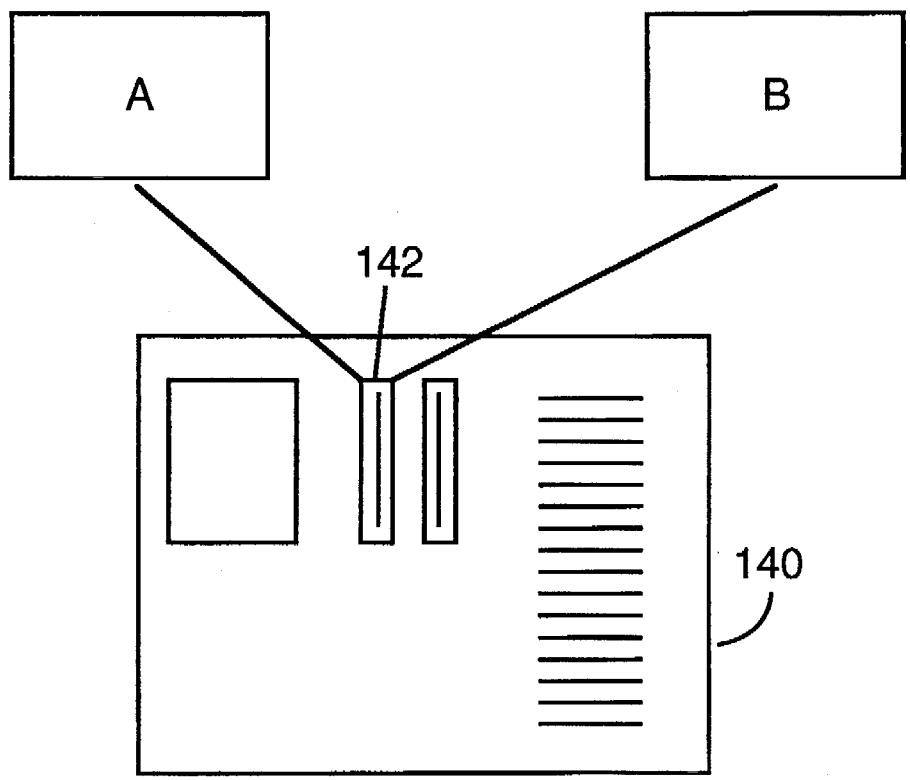
FIG. 5 is a schematic drawing of two concurrent users of a tape subsystem.
Figure 6:
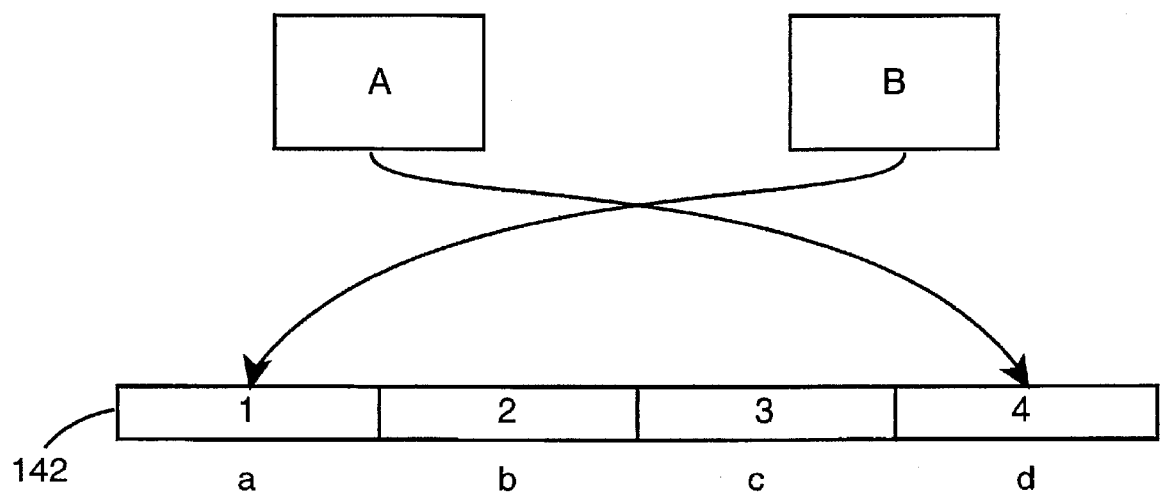
FIG. 6 is a schematic diagram of two users sharing a tape volume.
Figure 7:
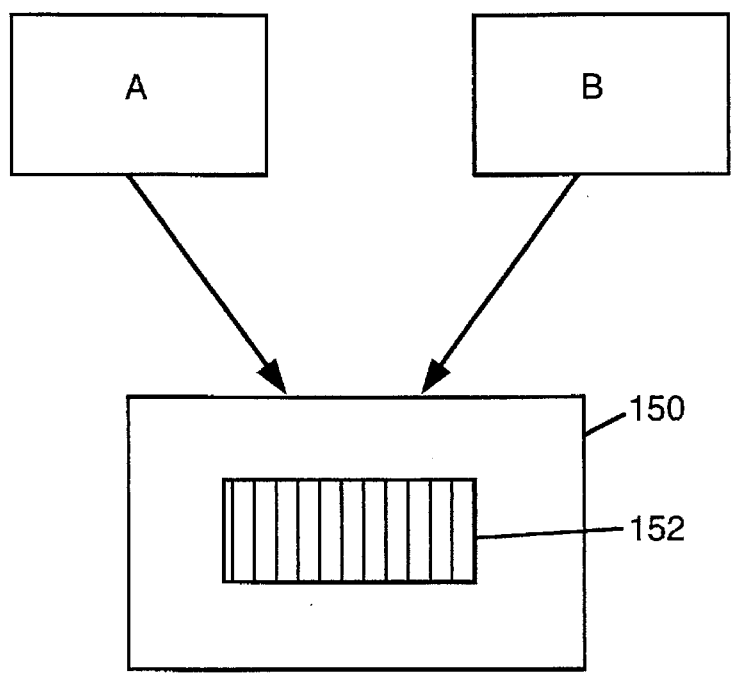
FIG. 7 is a schematic representation of an optical disk media changer for multiple optical disks.

Turning now to FIG. 5, a schematic drawing of a tape volume 142 mounted in a drive system 140, being shared by two processes, A & B is shown. As indicated above, the present invention or variations of it can be used to schedule any system involving concurrent access by multiple users to shared devices or objects that have significant setup or re-positioning time penalties. For example, as shown in FIG. 7, an optical disk media changer 150, controlling multiple optical disks 152, might be such a shared device.

While a preferred embodiment of the present invention is used to schedule concurrent access by multiple users to shared media for data storage applications in which repositioning or setup of the media for each access is costly, it will be apparent to those skilled in the art that the method and apparatus of the present invention could be used to manage other shared media objects, and in other types of applications using multiple processes where repositioning or setup time of shared resources accessed by the processes is costly.

Figure 8:
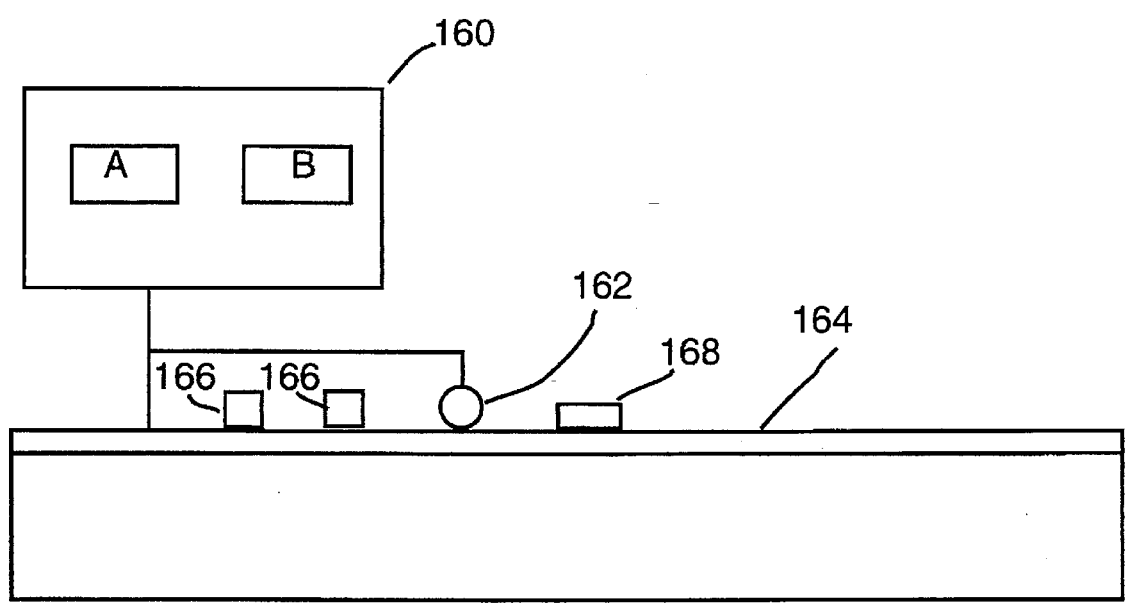
FIG. 8 is a schematic representation of an automated assembly operation having a positionable shared tool.

For example, with reference now to FIG. 8, if parts 166, on a conveyor belt 164, are being shaped by a position tool 162 under the control of a computer or programmable controller 160, the present invention could be used to permit processes A and B to share the use of positionable tool 162. If each process is likely to reposition positionable tool 162 for its own use, then the present invention could provide improved throughput times for the overall system if concurrent access to positionable tool 162 is shared.

In a preferred embodiment, the present invention is embodied in computer software written in the C++ programming language for Unix operating systems. As will be apparent to those skilled in the art, it could also be embodied in computer software written in other programming languages, such as C, or assembler or ADA or Pascal, or Visual Basic and so on, for either Unix or other operating systems that permit multiple processes or users to share some limited resources. It could also be written as operating system level software, if desired. Similarly, while a preferred embodiment operates as application software brought into a computer from a disk library for execution, it could also be embodied in firmware or circuitry or gate arrays for special purpose applications, such as programmable logic controllers for computer automated manufacturing.

Those skilled in the art will appreciate that the embodiments described above are illustrative only, and that other systems in the spirit of the teachings herein fall within the scope of the invention.

What is claimed is:

1. An apparatus for scheduling automated access by concurrent users to shared objects, where such shared objects are characterized by costly setup or repositioning time, comprising:

means for locking access to said shared object to one user at a time;

means for indicating the status of said shared object;

means for analyzing suitability of a user as a candidate for access to said shared object by waiting a predetermined interval before repositioning said shared object;

means for tracking a user's use of said shared object; and means for releasing access to said shared object, so that a user may determine whether it is the best candidate to access said shared object at a given time without causing excessive repositioning or setup of said shared object.

2. The apparatus of claim 1 wherein said means for analyzing suitability of a user as a candidate for access to said shared object further comprises:

means for determining whether a predetermined interval has elapsed since any user's last access;

means for determining whether access to said shared object has changed so that said inquiring user may access said shared object if said predetermined interval has elapsed and access to said shared object has not changed recently.

3. The apparatus of claim 1, wherein said means for tracking a user's use of said shared object further comprises:

user beginning time indicator for indicating when a user starts to analyze its suitability as a candidate for access to said shared object;

user last position indicator, for indicating where a user last left said shared object positioned, when said user had control of said shared object.

4. The apparatus of claim 1, wherein said means for locking access to said shared object further comprises a protocol for permitting only one user at a time to have access to said shared object.

5. The apparatus of claim 1, wherein said means for indicating the status of said shared object further comprises globally visible indicators that are available to all users for reference and maintenance.

6. The apparatus of claim 1, wherein said means for tracking a user's use of said shared object further comprises locally visible indicators that are unique to each of said users.

7. The apparatus of claim 1, wherein said means for analyzing suitability further comprises a wait check period interval that is not greater than said predetermined interval, such that said user will analyze its suitability each time said wait check period interval expires.

8. The apparatus of claim 1, wherein said means for analyzing suitability further comprises a means for ignoring said predetermined interval and seizing control of said shared object, so that emergency priority users may have access to said shared object.

9. The apparatus of claim 1, wherein said means for indicating the status of said shared object further comprises:

a current position indicator for showing the current position of said shared object;

a last access time indicator for showing the last time any user accessed said shared object;

a last preemption time indicator for showing the last time access to said shared object changed from one user to another before said predetermined interval had elapsed; and means for updating said last preemption time indicator when a preemption occurs.

10. The apparatus of claim 9, wherein said means for releasing access to said shared object further comprises:

means for updating said current position indicator to reflect a current position of said shared object; and means for updating said last access time indicator to reflect a current time.

11. A method for scheduling automated access by concurrent users to shared objects, where such shared objects are characterized by costly setup or repositioning time, comprising the steps of:

locking access to said shared object to one user at a time;

indicating the status of said shared object;

analyzing suitability of a user as a candidate for access to said shared object by waiting a predetermined interval before repositioning said shared object;

tracking a user's use of said shared object; and releasing access to said shared object, so that a user may determine whether it is the best candidate to access said shared object at a given time without causing excessive repositioning or setup of said shared object.

12. The method of claim 11, wherein said step of analyzing suitability of a user as a candidate for access to said shared object further comprises the steps of:

determining whether a predetermined interval has elapsed since any user's last access;

determining whether access to said shared object has changed so that said inquiring user may access said shared object if said predetermined interval has elapsed and access to said shared object has not changed recently.

13. The method of claim 11, wherein said step of tracking a user's use of said shared object further comprises the steps of:

indicating when a user starts to analyze its suitability as a candidate for access to said shared object by a user beginning time indicator;

indicating where a user last left said shared object positioned, when said user had control of said shared object by a user last position indicator.

14. The method of claim 11, wherein said step of locking access to said shared object further comprises the step of using a protocol for permitting only one user at a time to have access to said shared object.

15. The method of claim 11, wherein said step of indicating the status of said shared object further comprises the step of using globally visible indicators that are available to all users for reference and maintenance.

16. The method of claim 11, wherein said step of tracking a user's use of said shared object further comprises the step of having locally visible indicators that are unique to each of said users.

17. The method of claim 11, wherein said step of analyzing suitability further comprises the step of using a wait check period interval that is not greater than said predetermined interval, such that said user will analyze its suitability each time said wait check period interval expires.

18. The method of claim 11, wherein said step of analyzing suitability further comprises the step of ignoring said predetermined interval and seizing control of said shared object, so that emergency priority users may have access to said shared object.

19. The method of claim 11, wherein said step of indicating the status of said shared object further comprises the steps of:

showing the current position of said shared object by a current position indicator;

showing the last time any user accessed said shared object by a last access time indicator;

showing the last time access to said shared object changed from one user to another before said predetermined interval had elapsed by a last preemption time indicator; and updating said last preemption time indicator when a preemption occurs.

20. The method of claim 19, wherein said step of releasing access to said shared object further comprises:

updating said current position indicator to reflect a current position of said shared object;

updating said last access time indicator to reflect a current time.

* * * * *